(12) United States Patent
Ellesgaard et al.

(10) Patent No.: US 10,404,191 B2
(45) Date of Patent: Sep. 3, 2019

(54) STATOR AND A MOTOR

(71) Applicant: PCB Motor APS, Ballerup (DK)

(72) Inventors: Henning Ellesgaard, Vaerlose (DK); Eivind Johansen, Alsgarde (DK)

(73) Assignee: PCB MOTOR APS, Hillerod (DK)

( * ) Notice: Subject to any disclaimer, the term of this patent is extended or adjusted under 35 U.S.C. 154(b) by 320 days.

(21) Appl. No.: 15/300,368

(22) PCT Filed: Mar. 19, 2015

(86) PCT No.: PCT/DK2015/050058
§ 371 (c)(1),
(2) Date: Sep. 29, 2016

(87) PCT Pub. No.: WO2015/149807
PCT Pub. Date: Oct. 8, 2015

(65) Prior Publication Data
US 2017/0179851 A1 Jun. 22, 2017

(30) Foreign Application Priority Data
Apr. 2, 2014 (DK) .................................. 2014 70167

(51) Int. Cl.
*H02N 2/16* (2006.01)
*H02N 2/12* (2006.01)
(52) U.S. Cl.
CPC ............... *H02N 2/163* (2013.01); *H02N 2/12* (2013.01)
(58) Field of Classification Search
USPC .................................................... 310/323.06
See application file for complete search history.

(56) References Cited

U.S. PATENT DOCUMENTS 4,814,660 A 3/1989 Yamada et al.
4,885,499 A 12/1989 Ueha et al.
(Continued)

FOREIGN PATENT DOCUMENTS

CN 102931869 A 2/2013
CN 102931875 A 2/2013
(Continued)

OTHER PUBLICATIONS

Supplementary European Search Report for 15 77 2799 dated Dec. 1, 2017.
(Continued)

*Primary Examiner* — Bryan P Gordon
(74) *Attorney, Agent, or Firm* — Pearne & Gordon LLP (57) ABSTRACT

The invention relates to a stator for an electro-mechanical wave motor and an electro-mechanical wave motor including such stator. The stator includes a plurality of actuators positioned along a closed travelling path on at least a first side of the substrate. The plurality of actuators is configured to generate a travelling wave along the closed travelling path. The substrate has an outer periphery structure and an inner periphery structure and a plurality of rigid outer bridge structures and at least one rigid inner bridge structure. Each of the rigid outer bridge structures extends from the outer periphery structure and outwards and is connected to or adapted to be connected to an outer stabilization member and the at least one rigid inner bridge structure extends from the inner periphery structure and inwards and is connected to or is adapted to be connected to an inner stabilization member.

22 Claims, 8 Drawing Sheets

(56) References Cited

U.S. PATENT DOCUMENTS

| | | | |
|---|---|---|---|
| 5,949,178 A | 9/1999 | Tamai et al. | |
| 7,723,900 B2 | 5/2010 | Ellesgaard et al. | |
| 8,063,538 B2 | 11/2011 | Asano | |
| 8,330,326 B2 | 12/2012 | Asano | |
| 8,330,327 B2 | 12/2012 | Asano | |
| 8,981,619 B2 * | 3/2015 | Kimura | H02N 2/0015 310/323.16 |
| 2008/0309193 A1 | 12/2008 | Ellesgaard et al. | |
| 2010/0007244 A1 * | 1/2010 | Fujimoto | H02N 2/163 310/323.06 |
| 2011/0025167 A1 | 2/2011 | Asano | |
| 2011/0215675 A1 | 9/2011 | Asano | |
| 2014/0009667 A1 * | 1/2014 | Nakazumi | G02B 7/08 348/357 |

FOREIGN PATENT DOCUMENTS

| | | |
|---|---|---|
| CN | 103929091 | 7/2014 |
| EP | 0 360 199 A2 | 3/1990 |
| EP | 0740353 | 10/1996 |
| EP | 1941608 | 2/2013 |
| JP | 63-89074 A | 4/1988 |
| JP | S63190570 | 8/1988 |
| JP | 2009-514491 A | 4/2009 |
| JP | 2010-022169 A | 1/2010 |
| WO | 2007048412 | 5/2007 |

OTHER PUBLICATIONS

Chinese Office action for 201580017714.6 dated Jan. 30, 2018.
Chinese Office action for 201580017714.6 dated Oct. 8, 2018.
Search Report dated Oct. 24, 2014 for PA 2014 70167.
International Search Report dated Jun. 17, 2016 for PCT/DK2015/050058.
Japanese Office Action for Application No. 2016-560585, dated Jan. 29, 2019.

* cited by examiner

STATOR AND A MOTOR

TECHNICAL FIELD

The present invention relates to a stator for a for an electro-mechanical wave motor and a motor comprising such stator

BACKGROUND ART

Electro-mechanical wave motors also called ultrasonic motors are well known in the art and such motors are increasingly used due their superior properties and relatively low cost compared to other motors such as conventional electromagnetic step motors. Generally electro-mechanical wave motors are can operate with very high accuracy and without any substantially slip and simultaneously with very low noise.

EP1941608 describes a stator for a for an electro-mechanical wave motor in form of an electro-mechanical wave device comprising a substrate for propagation of a mechanical wave and for transmission of electrical signals through conductors accommodated by the substrate. A plurality of actuators are positioned on the substrate for generation of the mechanical wave and each of the actuators are connected to a respective set of conductors of the substrate for reception of an excitation signal transmitted by the set of conductors. The actuators generate the mechanical wave propagating in the substrate along a predetermined propagation path in response to the excitation signals.

US2011025167A describes an ultrasonic motor with a stator having n number of piezoelectric elements affixed to one surface of a vibrating member formed of a plate member whose outer circumferential edge is circular or polygonal. The vibrating member comprises 4n piezoelectric elements that are secured to one surface of the vibrating member for generating a traveling wave of a 3n wave (n is a natural number) traveling in a circulating manner by vibrating the vibrating member. The 4n piezoelectric elements being disposed so as to be dispersed in a circumferential direction, which is a direction, in which the traveling wave circulates, US2011215675 discloses a stator in form of a piezoelectric oscillator that generates a travelling wave using two B (1, n) mode (n is a natural number) standing waves that are out of phase with each other by 90 degrees. On a lower surface of the oscillating body, (4/3)$n$ piezoelectric elements are provided in order to generate an n-wave travelling wave by combining the two B (1, n) mode standing waves that are out of phase with each other by 90 degrees.

To provide a very accurate electro-mechanical wave it is generally desired that the wave formation has a substantially size to ensure an effective operative connection between the stator and the rotor.

However the inventors of the present invention have observed that when the standing waved of the stator may result in torsion of the stator in particular where the stator has a closed travelling path. This torsion is undesired for several reasons. For example the torsion may result in reduced operative connection between the stator and a rotor and further the torsion may result in undesired wear and inducement in defect in the stator during use.

DISCLOSURE OF INVENTION

An object of the invention is to provide a stator for an electro-mechanical wave motor which stator high resistance against torsional forces when subjected to travelling waves along a closed travelling path of the stator.

A further object of the invention is to provide an electro-mechanical wave motor which operates with a high accuracy and has a high resistance against wear and closed travelling path These and other objects have been solved by the invention or embodiments thereof as defined in the claims and as described herein below.

It has been found that the invention or embodiments thereof have a number of additional advantages which will be clear to the skilled person from the following description.

The stator of the invention for an electro-mechanical wave motor comprises a substrate with a first side and a second side and a plurality of actuators positioned along a closed travelling path on at least the first side of the substrate. The plurality of actuators is configured to generate a travelling wave along the closed travelling path.

The plurality of actuators positioned along the closed travelling path in any suitable way e.g. as described in EP 1 941 608, U.S. Pat. Nos. 8,330,327 or 8,063,538. It is well known in the art to generate such traveling wave using actuators mounted along a closed traveling path on a substrate and in principle can any of these prior art methods and configurations of actuators on a substrate be used in the present invention.

According to the invention the substrate of the stator has an outer periphery structure and an inner periphery structure and a plurality of rigid outer bridge structures and at least one rigid inner bridge structure. The outer periphery structure extends outside and along the travelling path interrupted by the plurality outer bridge structures and the inner periphery structure extends inside and along the travelling path interrupted by the at least one inner bridge structure.

Each of the rigid outer bridge structures extends from the outer periphery structure and outwards and is connected to or adapted to be connected to an outer stabilization member and the at least one rigid inner bridge structure extends from the inner periphery structure and inwards and is connected to or is adapted to be connected to an inner stabilization member.

Due to the structure of the stator provided by the outer periphery structure and the inner periphery structure it has been found that the stator has very high stability and resistance against torsional forces when subjected to travelling waves along a closed travelling path of the stator. In particular the outer stabilization member and the inner stabilization member ensure a very high resistance against torsional forces when subjected to travelling waves along a closed travelling path of the stator. Due to the bridge structures a motor comprising such stator can operate with very high power and also it has been found that the bridge structures comprising the outer periphery structure and the inner periphery structure add to the durability of a motor comprising such stator of the invention, since the high resistance against torsional forces when subjected to travelling waves along a closed travelling path of the stator have been found to result in that the motor will be subjected to very low wear compared to electro-mechanical wave motors with prior art stators.

The term "inside" means the area encircled by the closed travelling path.

The term "outside" means on the other side of the travelling path than the area encircled by the closed travelling path.

The term "outwards" means in a direction from the outer periphery structure and away from the travelling path.

The term "inwards" means in a direction opposite to outwards.

The term "rigid' means that the rigid unit is stiff at 25° C., preferably by having an elastic modulus of at least about 5 GPa.

The term "essentially smooth" means herein substantially free of cavities and protrusions which are visible by the average eye.

The term "substantially" should herein be taken to mean that ordinary product variances and tolerances are comprised.

It should be emphasized that the term "comprises/comprising" when used herein is to be interpreted as an open term, i.e. it should be taken to specify the presence of specifically stated feature(s), such as element(s), unit(s), integer(s), step(s) component(s) and combination(s) thereof, but does not preclude the presence or addition of one or more other stated features.

A term when used in singular form should be interpreted to also include the plural meaning of the term unless the context clearly dictates otherwise. For example an or the inner periphery structure also includes a plurality of inner periphery structures, whereas one or the one inner periphery structure means the specifically one inner periphery structure referred to.

Advantageously at least the first side of the substrate is substantially planar thereby ensuring a good operational contact with a rotor when applied in a motor. Preferably the substrate as such is a planar substrate. Thereby both the first and the second sides of the substrate can in a simple way be mounted in a motor such that good operational contact is ensured.

The substrate should advantageously be relatively stiff, however not so stiff that the traveling wave will result in an excessive amount of damaging cracks.

In an embodiment the substrate is of a material having an elastic modulus of from about 5 to about 30 GPa determined at 25° C., such as from about 10 to about 25 GPa.

Suitable materials for the substrate includes ceramics, a silicon materials, or synthetic resins, reinforced polymers or combinations. Preferred materials includes such materials that are usually applied for printed circuit boards (PBC materials), such as polyimide (PI) or glass fiber reinforced epoxy, e.g. FR4. FR4 has an elastic modulus are 25° C. of about 17-18 GPa.

Advantageously the substrate is a layered substrate

In an embodiment the substrate has a Poissons ratio up to about 0.3, such as from about 0.1 to about 0.2. Poissons ratio is the negative ratio of transverse to axial strain.

In an embodiment the substrate has a Q factor of at least about 10, preferably at least about 15.

The Q factor or quality factor is a dimensionless parameter that describes how under-damped the substrate is relative to its center frequency In order to sustain a system in resonance in constant amplitude by providing power externally, the energy that has to be provided within each cycle is less than the energy stored in the system (i.e., the sum of the potential and kinetic) by a factor of Q/(2π).

The Q factor is defined in terms of the ratio of the energy stored in the substrate to the energy supplied by a generator, per cycle, to keep signal amplitude constant, at the resonant a frequency of the substrate:

$$Q = 2\pi \times \frac{\text{Energy Stored}}{\text{Energy dissipated per cycle}} = 2\pi f_r \times \frac{\text{Energy Stored}}{\text{Power Loss}}.$$

The actuators can in principle be any kind of actuators such as the actuators known in the art for use in electromechanical wave devices. In an embodiment the actuators are piezoelectric actuator e.g. piezoelectric ceramic actuators.

In an embodiment the actuators are magneto-restrictive actuators. Different types of actuators may be combined. Preferably, the plurality of actuators comprises a plurality of single layer piezoelectric actuators due to their low cost. Multilayer piezoelectric actuators may also be employed.

The actuators may have any suitable shape and size, e.g. as the actuators described in EP 1 941 608, U.S. Pat. Nos. 8,330,327 or 8,063,538.

The closed travelling path may comprise any number of actuators e.g. such as described in EP 1 941 608, U.S. Pat. Nos. 8,330,327 or 8,063,538. In an embodiment the closed travelling path comprises an even number of actuators, preferably 8 times n, where n is an integer, such as an integer up to about 32.

In principle the closed travelling path can have any closed shape. The rotor which the stator is adapted to be mounted with in a motor should advantageously be designed to provide a good operation with the shape of the travelling wave. In an embodiment the closed travelling path is oval. In an embodiment the closed travelling path is substantially circular and having a center axis. For most applications it is generally desired that the closed travelling path is substantially circular.

Advantageously the actuators are arranged to form at least two standing waves, wherein adjacent standing waves are out of phase. Such standing waves provide a very stable motor function when the stator is mounted in a motor.

The actuators are powered via conductors applied in a circuitry. The conductors may e.g. be arranged as in the 1 941 608, U.S. Pat. Nos. 8,330,327 or 8,063,538.

For increasing the power of a motor comprising the stator, the actuators are advantageously arranged to form a plurality of travelling waves. In this embodiment is should be observed that the circuitry should advantageously also be adapted for feeding the required power to the actuators.

In an embodiment the stator further comprises a plurality of actuators positioned along a second closed travelling path on the second side of the substrate, the actuators being configured to generate at least one travelling wave along the closed travelling path on the second side of the substrate. Preferably the actuators on the first side and the actuators on the second side of the substrate are arranged and configured to generate cooperating travelling wave(s). Such double sided stators may provide additional power to the motor.

In an embodiment the actuators each has a length determined along tangent to the direction of the traveling path at the mid of the respective actuator. For simplifying the design the length of the respective actuators are advantageously substantially identical. In an embodiment the length of the respective actuators differs along the closed traveling path. Such construction may be advantageous in certain applications.

In an embodiment the actuators each has height determined perpendicular to the substrate and a width determined perpendicular to its length and its height. Preferably the heights of the respective actuators are substantially identical. Thereby a rotor may be arranged in operational contact with at least the first side of the stator in a simple way.

The width of the respective actuators may differ, but generally it is desired that the width of the respective actuators are substantially identical.

In an embodiment the travelling path has a path width along its path determined at the width of the respective actuators along the path. Preferably the width of the path is substantially uniform.

In order to provide a desired support for the traveling wave the substrate may be designed with a suitably distance between the inner periphery structure and the outer periphery structure. The distance between the inner periphery structure and the outer periphery structure should advantageously be sufficiently large to provide a good and stable support for the actuators. On the other hand the between the inner periphery structure and the outer periphery structure should advantageously not be too large, since this may make the structure of the substrate too inflexible which may result in that undesired cracks may be formed in the substrate doo to influence from the traveling wave.

Advantageously the distance between the inner periphery structure and the outer periphery structure is from about 0.5 times to about 100 times the average width of the actuators, such as from about 1 time to 20 times the average width of the actuators, such as about 4 times the average width of the actuators more preferably the actuators are arranged with uniform distance to the inner periphery structure and the outer periphery structure.

In an embodiment the distance between the inner periphery structure and the outer periphery structure is from about 1 mm to about 2 cm, preferably from about 2 mm to about 1 cm.

The rigid outer bridge structures and the one or more rigid inner bridge structures may in principle have any shape, such as straight, slightly curved, angular and accordion folded. For simplification of production it is often desired to provide the bridge structures to be relatively straight or bended with one or more curves. Bu forming one or more of the bridge structures to have curves, the bridge structures may be shaped to have a longer length than without curves.

In an embodiment at least one of the rigid outer bridge structures and/or the al least one rigid inner bridge structures is substantially straight.

In an embodiment at least one of the rigid outer bridge structures and/or the al least one inner rigid outer bridge structures is at least partly curved, preferably the at least partly curved rigid outer bridge structure comprises at least a curved section.

The rigid outer bridge structures may differ from each other e.g. in length or in minimum cross section area. This structure is in particularly advantageous where the travelling path is not circular.

In an embodiment the rigid outer bridge structures are substantially identical.

In an embodiment where the stator comprises a plurality of rigid inner bridge structures, these inner bridge structures may differ from each other e.g. in length or in minimum cross section area. This structure is in particularly advantageous where the travelling path is not circular.

In an embodiment where the stator comprises a plurality of rigid inner bridge structures, these inner bridge structures are substantially identical.

The rigid outer bridge structures each has a center line and a length determined along the center line. The length of the respective outer bridge structures is determined from the outer periphery structure to where the outer bridge structure is connected to or adapted to be connected to the outer stabilization member.

Advantageously the outer bridge structures should not be too short and preferably not shorter than about 1 mm. On the other hand the outer bridge structures should advantageous not be too long since this may result in low stability of the stator.

In an embodiment the length of the respective rigid outer bridge structures is from about 1 mm to about 10 cm, such as from about 2 mm to about 5 cm, such as from about 0.5 to 1 cm.

In an embodiment the rigid outer bridge has a length of from about $1/16$ to about the length of the travelling wave.

The rigid outer bridge structures each has a minimum cross section area determined in a cross section perpendicular to its centerline line (if bend the center line will be bended as well).

Advantageously the minimum cross section area of the outer bridge structures should not be too small since this may result in low stability of the stator. On the other hand the minimum cross section area of the outer bridge structures should not be large.

Advantageously the minimum cross section area of the respective outer bridge structures is up to about 100 mm$^2$, such as from about 1 mm$^2$ to about 50 mm$^2$, such as from about 4 mm$^2$ to about 20 mm$^2$.

The one or more rigid inner bridge structures each has a center line and a length determined along the center line. The length of the respective inner bridge structures is determined from the inner periphery structure to where the inner bridge structure is connected to or adapted to be connected to the inner stabilization member.

Advantageously the inner bridge structures should not be too short and preferably not shorter than about 1 mm. On the other hand the inner bridge structures should advantageous not be too long since this may take up undesired amount of space.

In an embodiment the length of the respective rigid inner bridge structures is from about 1 mm to about 10 cm, such as from about 2 mm to about 5 cm, such as from about 0.5 to 1 cm.

In an embodiment the rigid inner bridge has a length of from about $1/16$ to about the length of the travelling wave.

The one or more rigid inner bridge structures each has a minimum cross section area determined in a cross section perpendicular to its centerline line (if bend the center line will be bended as well).

Advantageously the minimum cross section area of the inner bridge structures should not be too small since this may result in that the resistance against torsional forces becomes lower than desired. On the other hand the minimum cross section area of the inner bridge structures should not be large.

Advantageously the minimum cross section area of the respective inner bridge structures is up to about 100 mm$^2$, such as from about 1 mm$^2$ to about 50 mm$^2$, such as from about 4 mm$^2$ to about 20 mm$^2$.

In an embodiment the longest of the rigid outer bridge structures and the at least one rigid inner bridge structure has a length which is up to about 2 times the length of the shortest of the rigid outer bridge structures and the at least one rigid inner bridge structure. In an embodiment the rigid outer bridge structures and the at least one rigid inner bridge structure have lengths within +−10% of the longest thereof.

In an embodiment the rigid outer bridge structures and the at least one rigid inner bridge structure have substantially equal lengths.

In an embodiment the rigid outer bridge structures and the at least one rigid inner bridge structure have minimum cross sectional area within +−10% of the largest minimum cross sectional area thereof.

In an embodiment the rigid outer bridge structures and the at least one rigid inner bridge structure have substantially equal minimum cross sectional area.

Advantageously the rigid inner structure(s) and the rigid outer bridge structures each have a first side and a second side in plan with respectively the first and second sides of the substrate of the stator. The rigid outer bridge structures preferably form an integrated part of the substrate.

In an embodiment the each of the rigid outer bridge structures is adapted to be connected to an outer stabilization member. In this embodiment the stator is designed such that the user when mounting the stator in a motor will connect the outer bridge structures to at least one outer stabilization member.

The outer bridge structures can in principle be connected to the outer stabilization member using any means.

For facilitating the connection of the outer bridge structures to the outer stabilization member, the outer bridge structures are advantageously prepared for the mounting and comprise connection means, such as one or more orifices, one or more click-lock elements, one or more surface areas adapted for gluing, soldering or welding or means for mechanical fixing.

In an embodiment the each of the one or more rigid inner bridge structures is adapted to be connected to an inner stabilization member. In this embodiment the stator is designed such that the user when mounting the stator in a motor will connect the inner bridge structures to at least one inner stabilization member.

The inner bridge structures can in principle be connected to the inner stabilization member using any means.

For facilitating the connection of the one or more inner bridge structures to the inner stabilization member, the inner bridge structures are advantageously prepared for the mounting and comprise connection means, such as one or more orifices, one or more click-lock elements, one or more surface areas adapted for gluing, soldering or welding or means for mechanical fixing.

In an embodiment the outer stabilization member forms an integrated part of the substrate. Advantageously each of the outer bridge structures is connected to the outer stabilization member. In an embodiment the outer stabilization member preferably has an annular shape surrounding the travelling path.

In an embodiment the stator comprises two or more outer stabilization members wherein at least two of the rigid outer bridge structures extends from the outer periphery structure and outwards and is connected to each of the two or more outer stabilization members.

In an embodiment the inner stabilization member forms an integrated part of the substrate. Preferably each of the outer bridge structures is connected to the inner stabilization member.

In an embodiment the substrate comprises two or more rigid inner bridge structures extending from the inner periphery structure and inwards and is connected to the inner stabilization member.

In an embodiment the substrate comprises two or more inner stabilization members wherein at least one and preferably two of the rigid inner bridge structures extends from the inner periphery structure and inwards and is connected to each of the two or more inner stabilization members.

The inner stabilization member preferably is shaped to forms a rotor shaft support. Such rotor shaft support provides additional stability to a motor comprising the stator.

Preferably the inner stabilization member has an aperture for a rotor shaft, where the aperture has a periphery providing the rotor shaft support.

As mentioned above the actuators are powered via conductors applied in a circuitry. The circuitry comprises a plurality of conductors adapted for guiding the required power to the actuators.

The respective conductors are advantageously applied to cross at least one of the outer bridge structures and/or at least one inner bridge structure.

Advantageously the stator wherein the substrate is a printed circuit board (PCB).

Advantageously at least one of the inner stabilization member and the outer stabilization member carries printed electronics for providing conductors for the actuators for generate the travelling wave.

In an embodiment inner stabilization member and the outer stabilization member form an integrated parts of the substrate.

In principle the stator may comprise as many outer bridge structures as desired, e.g. up to about 50 outer bridge structures or even up to about 100 outer bridge structures. However for simplification it is often desired to apply a relatively low number of outer bridge structures such as from 3 to 10 outer bridge structures.

Also the number of inner bridge structures may be high e.g. up to about 50 inner bridge structures. Advantageously the stator comprises up to about 20 inner bridge structures, preferably from 2 to 10 inner bridge structures.

In an embodiment the travelling path has a length $L_t$ and the travelling wave(s) has a length $L_w$, the substrate comprises up to 20 times $L_t/L_w$, such as from 1 to 10 times $L_t/L_w$ of rigid outer bridge structures.

In an embodiment the travelling path has a length $L_t$ and the travelling wave(s) has a length $L_w$, the substrate comprises up to 20 times $L_t/L_w$, such as from 1 to 10 times $L_t/L_w$ of inner bridge structures.

It has been found that a surprisingly high resistance against torsional forces can be obtained where the number of rigid outer bridge structures is equal to or larger than the number of rigid inner bridge structures. In particular where the substrate comprises pair wise rigid outer bridge structures and rigid inner bridge structures arranged opposite to each other along the travelling path an even better resistance against torsional forces can be obtained. In an embodiment the substrate comprises from 2 to 10 pair wise rigid outer bridge structures and rigid inner bridge structures, such as 4 pair wise rigid outer bridge structures and rigid inner bridge structures.

In an embodiment where the actuators are arranged to form a plurality of standing waves along the length of the travelling path, wherein adjacent standing waves are out of phase it is preferred that pair wise rigid outer bridge structures and rigid inner bridge structures are arranged to extend from the respective outer or inner periphery structure adjacent to a position between two consecutive standing waves.

The rigid outer bridge structures are advantageously evenly distributed along the outer periphery structure.

In an embodiment where the stator comprises a plurality of rigid inner bridge structures, these rigid inner bridge structures are advantageously evenly distributed along the inner periphery structure.

The stator of the invention may be used in any kind of electro-mechanical wave motors The invention also relates to an electro-mechanical wave motor comprising a stator as claimed in any one of the preceding claims.

The electro-mechanical wave motor may for example be as the electro-mechanical wave motors e.g. in form of ultrasonic motors as known from the prior art with the modification that the stator of the invention is used instead of the prior art stators.

Examples of desired electro-mechanical wave motors are as the motors disclosed in EP 1 941 608, U.S. Pat. Nos. 8,330,327 or 8,063,538 the modification that the stator of the invention is used instead of the prior art stators.

In a preferred embodiment the motor comprises a rotor and a rotor shaft and the rotor is arranged in operational contact with at least the first side of the stator. Preferably the rotor shaft is supported by the inner stabilization member of the stator.

All features of the inventions including ranges and preferred ranges can be combined in various ways within the scope of the invention, unless there are specific reasons for not to combine such features.

BRIEF DESCRIPTION OF DRAWINGS

The invention will be explained more fully below in connection with a number of embodiments and with reference to the drawings in which.

The figures are schematic and may be simplified for clarity. Throughout, the same reference numerals are used for identical or corresponding parts.

Figure 1:
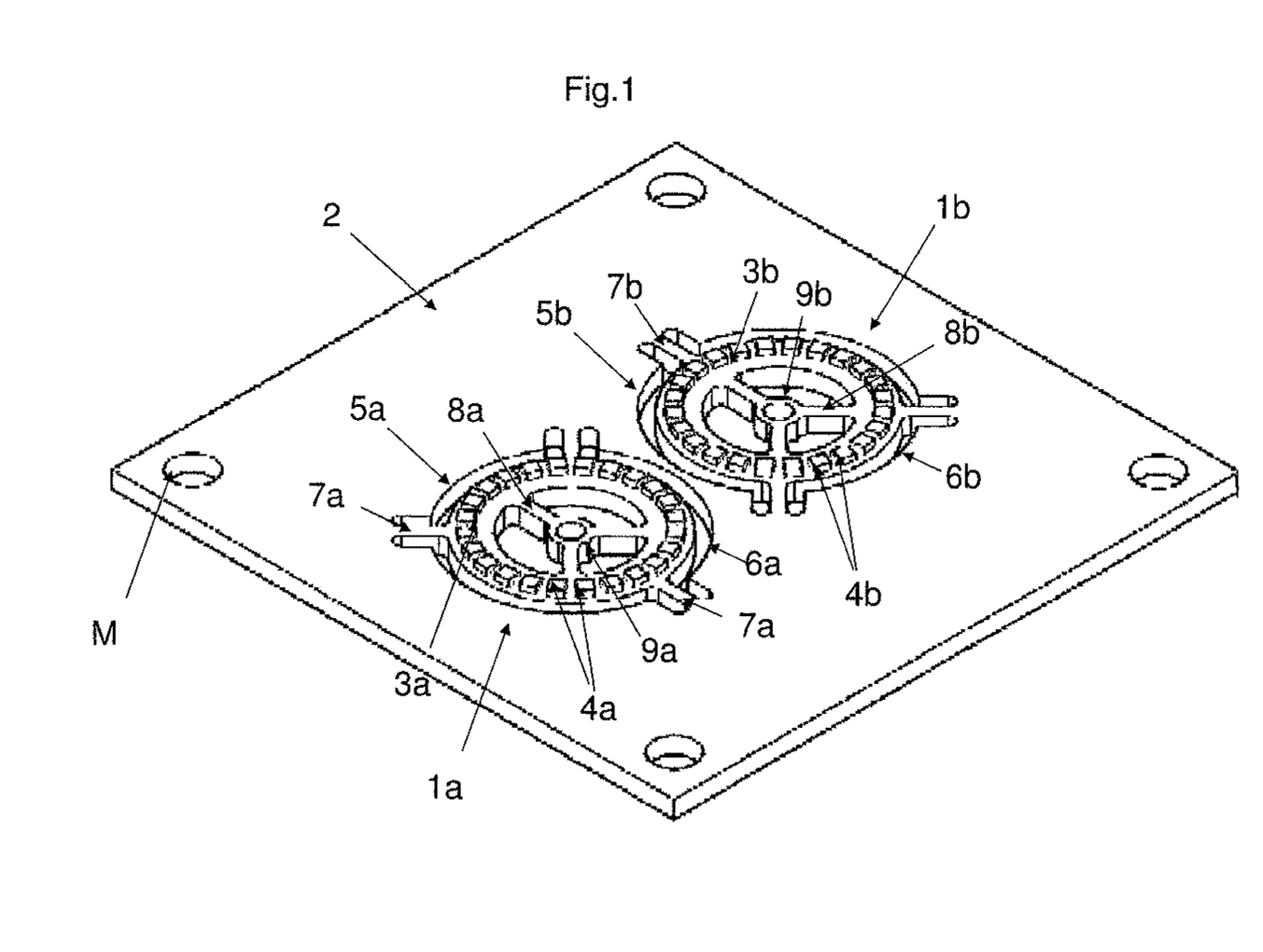
FIG. 1 shows a perspective top view of an embodiment of a stator of the invention.

The stator of FIG. 1 is a double stator comprising two stator elements 1a, 1b sharing the same outer stabilization member 2. A first of the stator elements 1a comprises a substrate 3a with a first side and a not shown second side and a plurality of actuators 4a positioned along a closed travelling path the first side of the substrate 3a. The plurality of actuators 4a is connected to not shown circuitry for supplying power to the actuators 4a for generating a travelling wave along the closed travelling path. The substrate has an outer periphery structure 5a and an inner periphery structure 6a and three rigid outer bridge structures 7a and three rigid inner bridge structures 8a.

The outer periphery structure 5a extends outside and along the travelling path interrupted by the plurality outer bridge structures 7a and the inner periphery structure 6a extends inside and along the travelling path interrupted by the inner bridge structures 8a. The rigid outer bridge structures extend from the outer periphery structure 5a and outwards and are connected to the outer stabilization member. The rigid inner bridge structures extend from the inner periphery structure 6a and inwards and are connected to an inner stabilization member 9a.

As it can be seen the closed travelling path is substantially circular.

Both the outer bridge structures 8a and the inner bridge structures 7a are substantially straight.

The inner stabilization member 9a forms a rotor shaft support and comprises an aperture for a rotor shaft.

The rigid outer bridge structures 7a of the stator elements 1a and the rigid inner bridge structures 8a arranged displaced relative to each other along the travelling path The second of the stator elements 1b comprises a substrate with a first side and a not shown second side and a plurality of actuators 4b positioned along a circular closed travelling path the first side of the substrate 3b. The substrate has an outer periphery structure 5b and an inner periphery structure 6b and three rigid outer bridge structures 7b and three rigid inner bridge structures 8b.

The outer periphery structure 5b extends outside and along the travelling path interrupted by the plurality outer bridge structures 7b and the inner periphery structure 6b extends inside and along the travelling path interrupted by the inner bridge structures 8b. The rigid outer bridge structures extend from the outer periphery structure 5b and outwards and are connected to the outer stabilization member. The rigid inner bridge structures extend from the inner periphery structure 6b and inwards and are connected to an inner stabilization member 9b.

As it can be seen the closed travelling path is substantially circular.

In the second stator member the rigid outer bridge structures 7b and the rigid inner bridge structures 8b are arranged opposite to each other along the travelling path.

The double stator comprising mounting holes M for being mounted with other elements of a motor.

Figure 2:
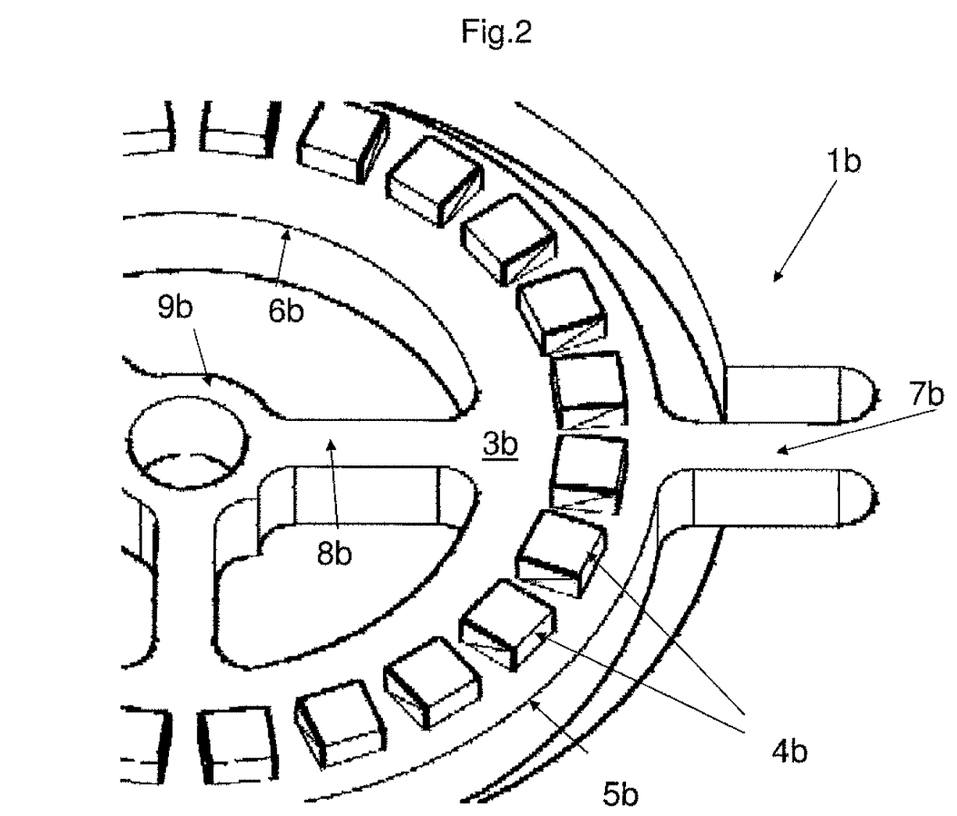
FIG. 2 shows a close up view of a section of the stator shown in FIG. 1.

The close up view of FIG. 2 shows a part of the second stator member 1b

Figure 3:
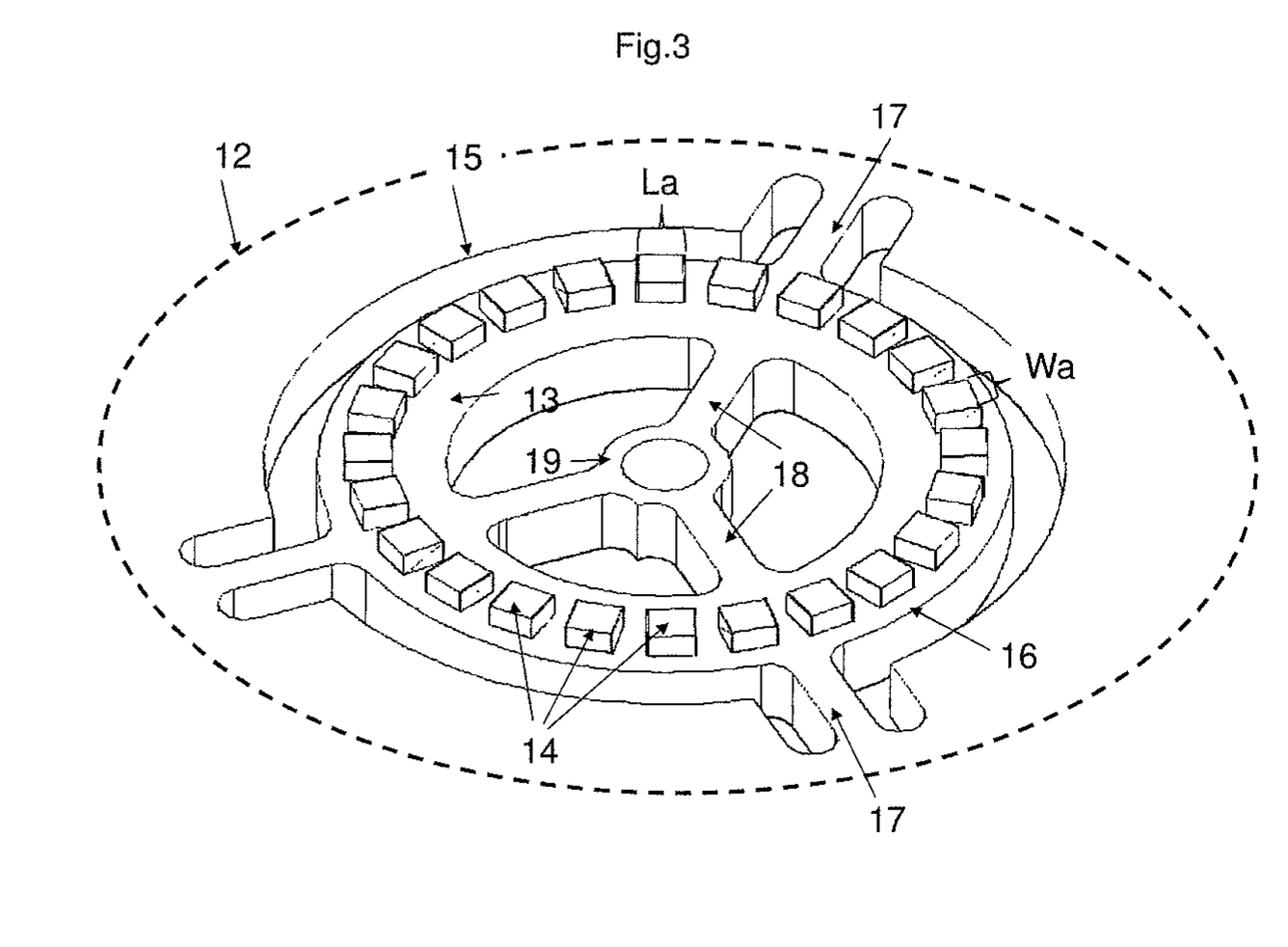
FIG. 3 shows a perspective top view of another embodiment of a stator of the invention.

The embodiment shown in FIG. 3 comprises a substrate 13 with a first side and a not shown second side and a plurality of actuators 14 positioned along a closed travelling path the first side of the substrate 13. The plurality of actuators 14 are connected to not shown circuitry for supplying power to the actuators 14 for generating a travelling wave along the closed travelling path. The substrate 13 has an outer periphery structure 15 and an inner periphery structure 16 and three rigid outer bridge structures 17 and three rigid inner bridge structures 18.

The outer periphery structure 15 extends outside and along the travelling path interrupted by the plurality outer bridge structures 17 and the inner periphery structure 16 extends inside and along the travelling path interrupted by the inner bridge structures 18. The rigid outer bridge structures extend from the outer periphery structure 15 and outwards and are connected to an outer stabilization member 12 indicated with the dotted line. The rigid inner bridge structures 18 extend from the inner periphery structure 16 and inwards and are connected to an inner stabilization member 19 which forms a rotor shaft support.

The actuators 14 each has a length La and a width Wa

The outer stabilization member 12 and the inner stabilization member 19 form integrated parts of the substrate. The outer stabilization member 12 has an annular shape surrounding the travelling path.

Figure 4:
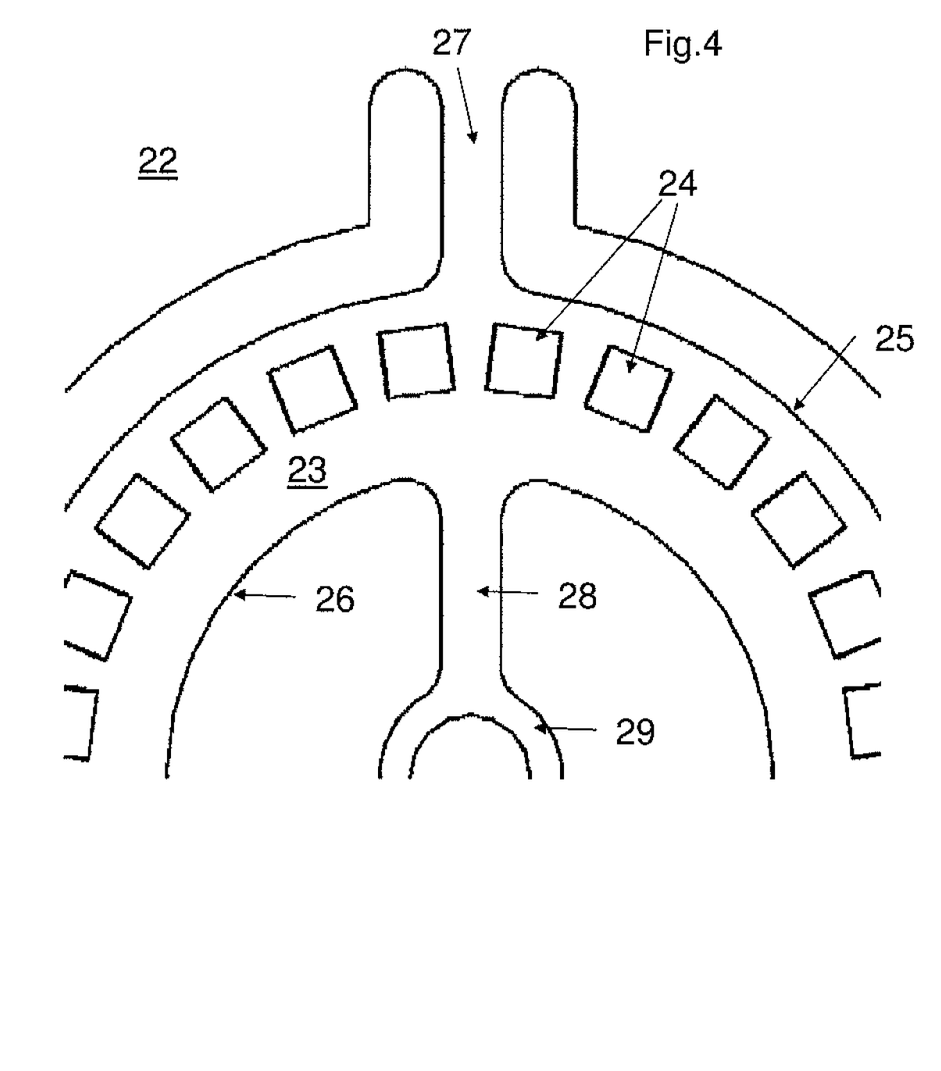
FIG. 4 shows a perspective top view of a section of a further embodiment of a stator of the invention.

The embodiment shown in FIG. 4 comprises a substrate 23 with a first side and a not shown second side and a plurality of actuators 24 positioned along a closed travelling path the first side of the substrate 23. The substrate 23 has an outer periphery structure 25 and an inner periphery structure 26 and a number of rigid outer bridge structures 27 where only one is seen and a single rigid inner bridge structure 28.

The outer periphery structure 25 extends outside and along the travelling path interrupted by the plurality outer bridge structures 27 and the inner periphery structure 26 extends inside and along the travelling path interrupted by the inner bridge structure 28. The rigid outer bridge structures extend from the outer periphery structure 25 and outwards and are connected to an outer stabilization member 22. The rigid inner bridge structure 28 extend from the inner periphery structure 16 and inwards and are connected to an inner stabilization member 29 which forms a rotor shaft support.

Figure 5:
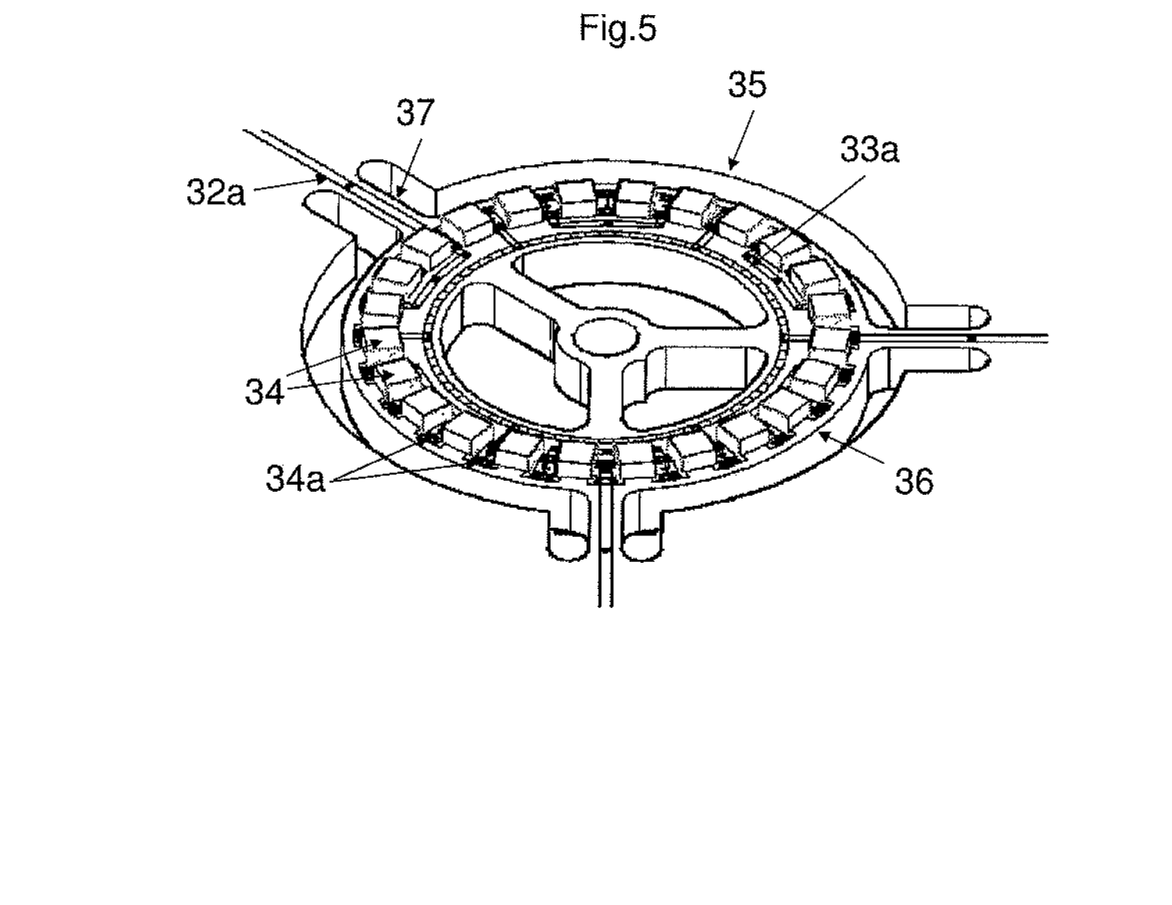
FIG. 5 shows a perspective top view of a further embodiment of a stator of the invention.

The embodiment shown in FIG. 5 comprises a substrate with a first side and a not shown second side and a plurality of actuators 34 positioned along a closed travelling path on the first side of the substrate. The plurality of actuators 34 are connected to a circuitry comprises conductors 34a connected to respective actuators 34f or supplying power to the actuators 34 via conductors 32a, 33a of the circuit for generating a travelling wave along the closed travelling path. The substrate has an outer periphery structure 35 and an inner periphery structure 36 and three rigid outer bridge structures 37 and three rigid inner bridge structures 38.

The outer stabilization member 32 and the inner stabilization member 39 form integrated parts of the substrate. The substrate is a printed circuit board wherein the circuit 32a, 33a, 34a is printed onto the substrate. The conductors 32a of the circuit is passing over the outer bridge structures 37, and the outer stabilization member carries not shown printed electronics e.

Figure 6:
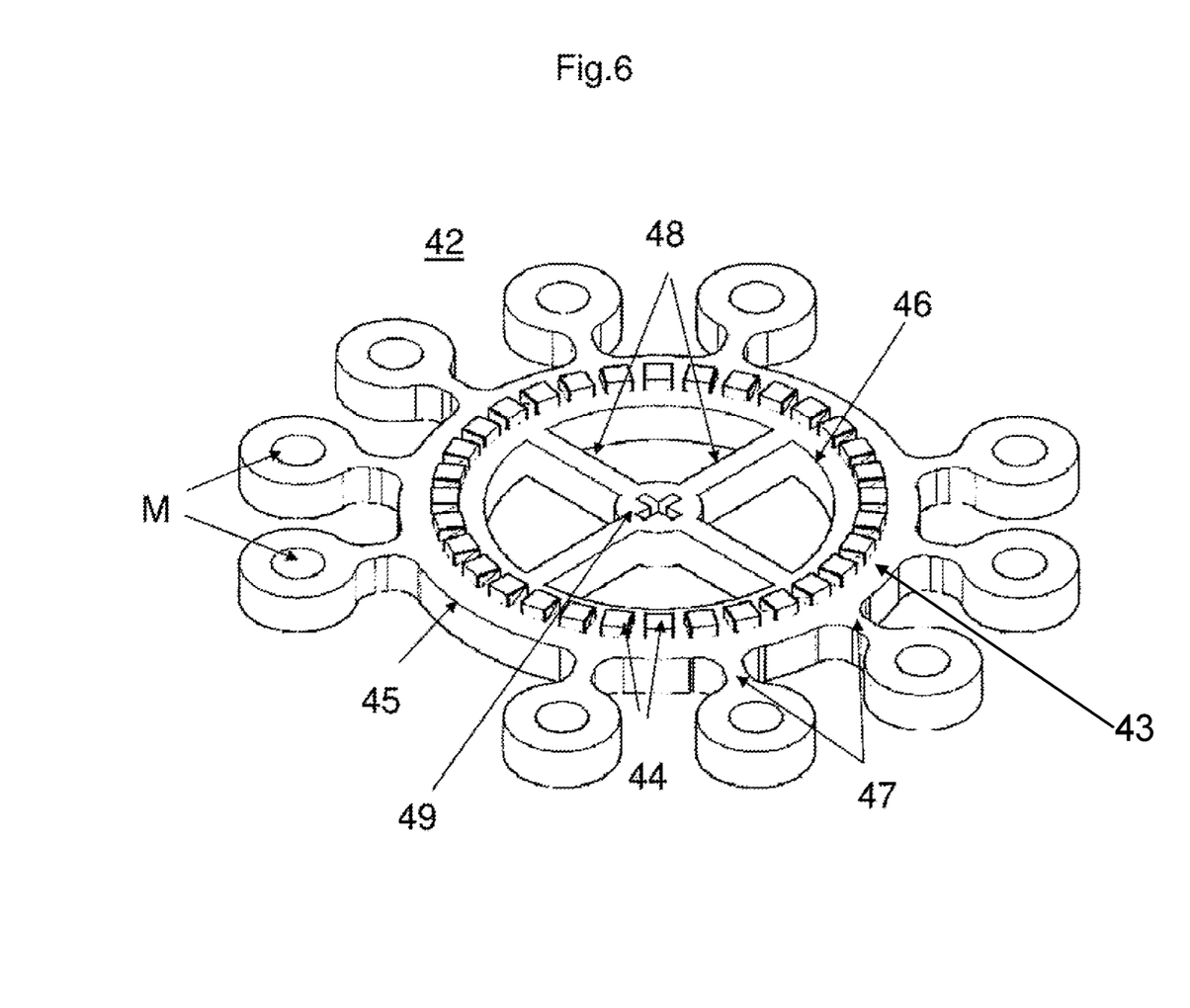
FIG. 6 shows a perspective top view of yet a further embodiment of a stator of the invention.
Figure 7:
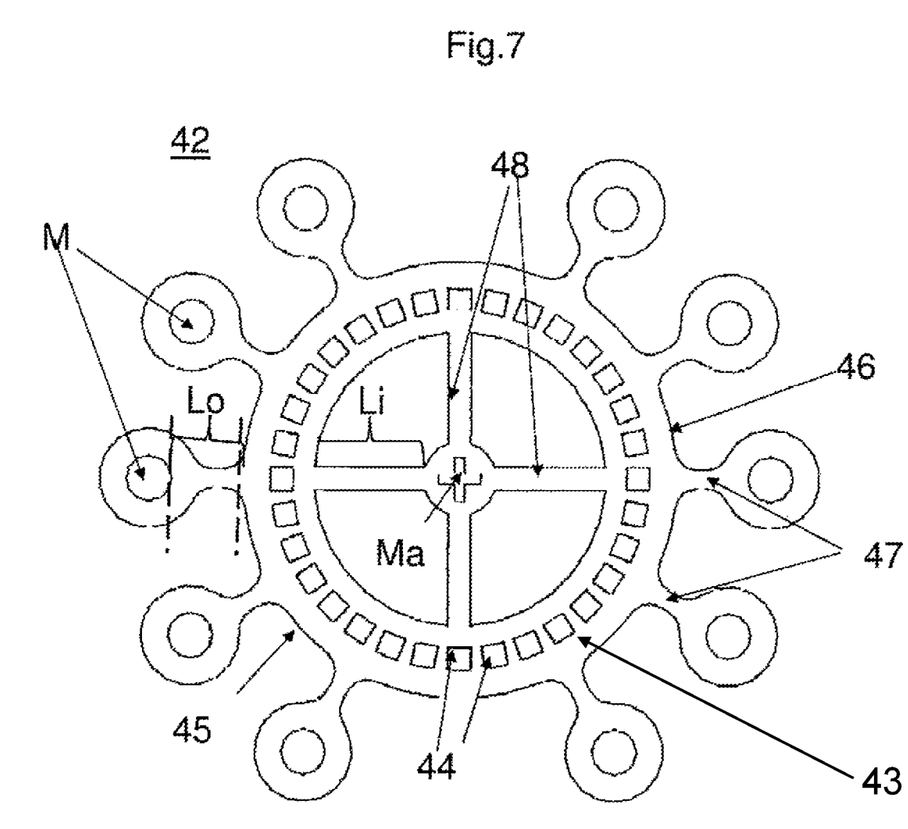
FIG. 7 shows a top view of the stator shown in FIG. 6.

The embodiment shown in FIG. 6 and FIG. 7 comprises a substrate with a first side 43 and a not shown second side and a plurality of actuators 44 positioned along a closed travelling path the first side of the substrate. The substrate has an outer periphery structure 45 and an inner periphery structure 46 and ten rigid outer bridge structures 47 and four rigid inner bridge structure 48.

The outer periphery structure 45 extends outside and along the travelling path interrupted by the plurality outer bridge structures 47 and the inner periphery structure 46 extends inside and along the travelling path interrupted by the inner bridge structures 48. The rigid inner bridge structures 48 each has a length Li and extends from the inner periphery structure 46 and inwards and are connected to an inner stabilization member 49 which comprises a mounting structure Ma. The rigid outer bridge structures extend from the outer periphery structure 45 and outwards and are is adapted to be connected to a not shown outer stabilization member.

The outer bridge structures 47 comprise connection means M in form of mounting orifice. The outer bridge structures 47 each has a length Lo extending from the outer periphery structure 45 and to the mounting orifice M.

Figure 8:
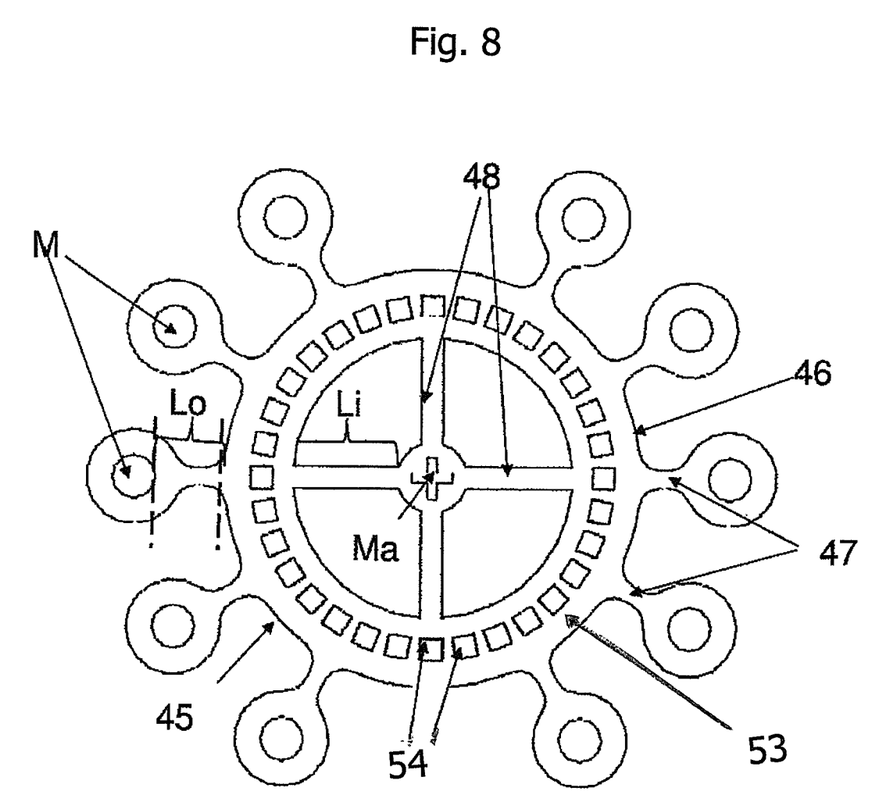
FIG. 8 shows a bottom view of the stator shown in FIG. 6.

FIG. 8 illustrates a second side 53 of the substrate shown in FIG. 6 and FIG. 7 and a plurality of actuators 54 positioned along a closed travelling path on the second side 53 of the substrate. Similar to FIG. 6 and FIG. 7, the substrate has an outer periphery structure 45 and an inner periphery structure 46 and ten rigid outer bridge structures 47 and four rigid inner bridge structure 48.

The outer periphery structure 45 extends outside and along the travelling path interrupted by the plurality outer bridge structures 47 and the inner periphery structure 46 extends inside and along the travelling path interrupted by the inner bridge structures 48. The rigid inner bridge structures 48 each has a length Li and extends from the inner periphery structure 46 and inwards and are connected to an inner stabilization member 49 which comprises a mounting structure Ma. The rigid outer bridge structures extend from the outer periphery structure 45 and outwards and are is adapted to be connected to a not shown outer stabilization member.

The outer bridge structures 47 comprise connection means M in form of mounting orifice. The outer bridge structures 47 each has a length Lo extending from the outer periphery structure 45 and to the mounting orifice M.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The invention is defined by the features of the independent claim(s). Preferred embodiments are defined in the dependent claims. Any reference numerals in the claims are intended to be non-limiting for their scope.

Some preferred embodiments have been shown in the foregoing, but it should be stressed that the invention is not limited to these, but may be embodied in other ways within the subject-matter defined in the following claims.

What is claimed is:

1. A stator for an electro-mechanical wave motor comprising a substrate with a first side and a second side and a plurality of actuators positioned along a closed travelling path on at least the first side of the substrate, the plurality of actuators being configured to generate a travelling wave along the closed travelling path, wherein the substrate has an outer periphery structure and an inner periphery structure and a plurality of rigid outer bridge structures and at least one rigid inner bridge structure, the outer periphery structure extends outside and along the travelling path interrupted by the plurality outer bridge structures and the inner periphery structure extends inside and along the travelling path interrupted by the at least one inner bridge structure, wherein each of the rigid outer bridge structures extends from the outer periphery structure and outwards and is connected to or adapted to be connected to an outer stabilization member and the at least one rigid inner bridge structure extends from the inner periphery structure and inwards and is connected to or is adapted to be connected to an inner stabilization member, wherein the substrate is a planar substrate and the at least one rigid inner bridge structure and the rigid outer bridge structures each have a rigid inner bridge structure first side and a rigid outer bridge structure second side in plane with respectively the first and second sides of the substrate of the stator.

2. The stator as claimed in claim 1 wherein the substrate is made of a material having an elastic modulus of from about 5 to about 30 GPa determined at 25° C.

3. The stator as claimed in claim 1 wherein the substrate has a Q-factor of at least about 10.

4. The stator as claimed in claim 1 wherein the closed travelling path is substantially circular or oval and comprises an even number of actuators, preferably 8 times n, where n is an integer.

5. The stator as claimed in claim 1 wherein the actuators are arranged to form at least two standing waves, wherein adjacent standing waves are out of phase.

6. The stator as claimed in claim 1 wherein the stator further comprises a plurality of actuators positioned along a second closed travelling path on the second side of the substrate, the actuators being configured to generate at least one travelling wave along the closed travelling path on the second side of the substrate.

7. The stator as claimed in claim 1 wherein the actuators each has a length determined along tangent to the direction of the traveling path at the mid of the respective actuator and the length of the respective actuators are substantially identical.

8. The stator as claimed in 7 wherein the actuators each has a height determined perpendicular to the substrate and a width determined perpendicular to its length and its height and the width of the respective actuators are substantially identical.

9. The stator as claimed in claim 8 wherein the distance between the inner periphery structure and the outer periphery structure is from about 0.5 times to about 100 times the width of the actuators.

10. The stator as claimed in claim 8 wherein at least one of the rigid outer bridge structures and/or the at least one rigid inner bridge structures is substantially straight.

11. The stator as claimed in claim 1 wherein at least one of the rigid outer bridge structures and/or the at least one inner rigid outer bridge structures is at least partly curved.

12. The stator as claimed in claim 1 wherein the rigid outer bridge structures each has a center line and a length determined along the center line, the length of the rigid outer bridge structures is from about 1 mm to about 10 cm.

13. The stator as claimed in claim 1 wherein the rigid outer bridge structures each has a minimum cross section area, the minimum cross section area is up to about 100 mm$^2$.

14. The stator as claimed in claim 1 wherein the at least one rigid inner bridge structure has a center line and a length determined along the center line, wherein the length of the at least one inner bridge structure is from about 1 mm to about 10 cm and the at least one rigid inner bridge structure has a minimum cross sectional area, wherein the minimum cross section area is up to about 100 mm$^2$.

15. The stator as claimed in claim 1 wherein each of the rigid outer bridge structures structures comprises connection means for being connected to the outer stabilization member.

16. The stator as claimed in claim 1 wherein the at least one rigid inner bridge structure is adapted to be connected to an inner stabilization member, the inner bridge structures comprises connection means for being connected to the inner stabilization member.

17. The stator as claimed in claim 1 wherein at least one of the outer stabilization member and the inner stabilization member forms an integrated part of the substrate.

18. The stator as claimed in claim 1, wherein the substrate is a printed circuit board (PCB).

19. The stator as claimed in claim 1 wherein the travelling path has a length $L_t$ and the travelling wave(s) has a length $L_w$, the substrate comprises up to 20 times $L_t/L_w$.

20. The stator as claimed in claim 1 wherein the actuators are arranged to form a plurality of standing waves along the length of the travelling path, wherein adjacent standing waves are out of phase and where pair wise rigid outer bridge structures and rigid inner bridge structures arranged to extend from the respective outer or inner periphery structure adjacent to a position between two consecutive standing waves.

21. An electro-mechanical wave motor comprising a stator wherein the stator comprises a substrate with a first side and a second side and a plurality of actuators positioned along a closed travelling path on at least the first side of the substrate, the plurality of actuators being configured to generate a travelling wave along the closed travelling path, wherein the substrate has an outer periphery structure and an inner periphery structure and a plurality of rigid outer bridge structures and at least one rigid inner bridge structure, the outer periphery structure extends outside and along the travelling path interrupted by the plurality outer bridge structures and the inner periphery structure extends inside and along the travelling path interrupted by the at least one inner bridge structure, wherein each of the rigid outer bridge structures extends from the outer periphery structure and outwards and is connected to an outer stabilization member and the at least one rigid inner bridge structure extends from the inner periphery structure and inwards and is connected to an inner stabilization member, wherein the substrate is a planar substrate and the at least one rigid inner bridge structure and the rigid outer bridge structures each have a rigid inner bridge structure first side and a rigid outer bridge structure second side in plane with respectively the first and second sides of the substrate of the stator.

22. An electro-mechanical wave motor as claimed in claim 21 wherein the motor comprises a rotor and a rotor shaft, the rotor is arranged in operational contact with at least the first side of the stator, preferably the rotor shaft is supported by the inner stabilization member of the stator.

* * * * *